March 10, 1959  C. A. VANDER PYL, JR  2,876,555
METHOD OF CURING POROUS, RESIN-TREATED PLEATED PAPER
Filed Oct. 8, 1956  4 Sheets-Sheet 1

INVENTOR.
CHESTER A. VANDER PYL JR.
BY
Charles E. Willson
ATTORNEY

March 10, 1959  C. A. VANDER PYL, JR  2,876,555
METHOD OF CURING POROUS, RESIN-TREATED PLEATED PAPER
Filed Oct. 8, 1956  4 Sheets-Sheet 2

INVENTOR.
CHESTER A. VANDER PYL JR.
BY
Charles C. Willson
ATTORNEY

INVENTOR.
CHESTER A. VANDER PYL JR.
BY Charles C. Willson
ATTORNEY

March 10, 1959  C. A. VANDER PYL, JR  2,876,555
METHOD OF CURING POROUS, RESIN-TREATED PLEATED PAPER
Filed Oct. 8, 1956  4 Sheets-Sheet 4
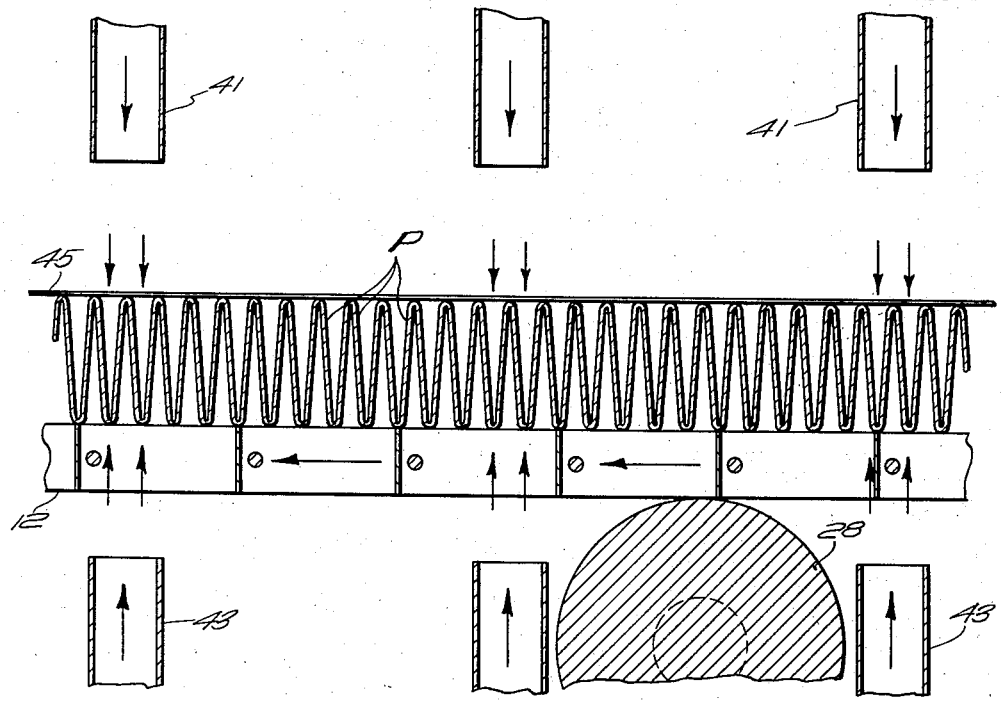
FIG. 6
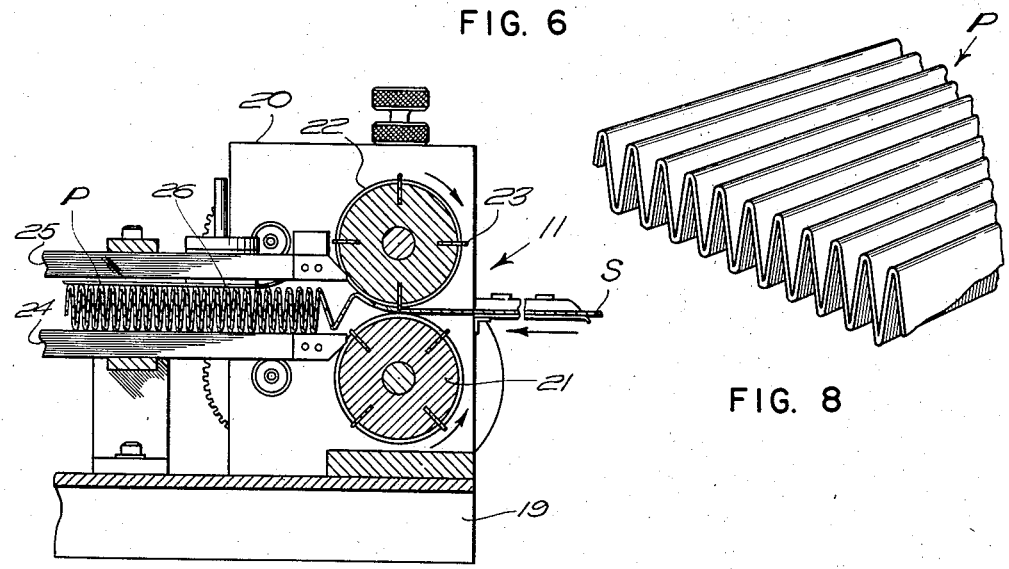
FIG. 7
FIG. 8
INVENTOR.
CHESTER A. VANDER PYL JR
BY
*Charles C. Willson*
ATTORNEY

United States Patent Office 2,876,555
Patented Mar. 10, 1959

2,876,555

METHOD OF CURING POROUS, RESIN-TREATED PLEATED PAPER

Chester A. Vander Pyl, Jr., North Attleboro, Mass., assignor to Fram Corporation, Providence, R. I., a corporation of Rhode Island Application October 8, 1956, Serial No. 614,509

1 Claim. (Cl. 34—23)

This invention relates to an air jet curing oven operable to cure uniformly resin impregnated pleated filter paper at a rate of several thousand pleats per minute.

The curing oven of the present invention was developed to produce rapidly, and at low cost, large quantities of pleated filter paper used in oil filters and air filters for motor vehicles and for other purposes. It has been common practice for years to use resin impregnated filter paper in oil filters, and to pleat such paper in order that a large quantity of paper can be placed in a small space. The demand for such pleated filter paper has grown rapidly. Better equipment is therefore needed to cure the resin in the pleated paper at the rate at which the paper is pleated. These needs are met in a very satisfactory manner by the present invention.

Heretofore such filter paper was commonly pleated on a reciprocating pleating machine of the type built many years ago to pleat dress goods, such as pleated skirts. These reciprocating pleaters will not operate at high speed, and if it is attempted to operate them at more than about 100 pleats per minute, the momentum of the reciprocating parts will produce non-uniform pleats.

Such filter paper is resin treated to stiffen the pleats and prevent them from becoming limp in the presence of moisture. The usual practice is to treat such paper with phenol formaldehyde, which is inexpensive and imparts the desired stiffness to the paper when cured.

Gas ovens and radiant heat ovens have been used heretofore to cure resin-treated pleated paper, but these prior ovens are open to the objection that they produce a non-uniform cure in that they cure the exposed pleat-folds or knuckles more quickly than the faces of the pleats between the knuckles. Furthermore, they will not cure quickly, as these ovens require anywhere from four to thirty minutes to heat the treated paper to the resin curing temperature. If it is attempted to speed up the cure by raising the temperature, the knuckles are likely to be charred before the pleat faces are cured, and the danger of fire is increased.

Very saisfactory results are secured in accordance with the present invention by employing hot air jets to cure the paper, as these jets of air will cure the pleated paper quickly and uniformly. This is due to the fact that the air can be heated to a temperature substantially above the curing temperature of the resin without causing a fire hazard, and the air from the jets can, upon entering between the pleats, move laterally as well as straight ahead to cure all parts of the paper. The air jets are directed against the bottom and top of the pleats simultaneously to penetrate the paper from both faces. This serves to raise the paper to the resin curing temperature almost immediately. It is found that if the pleats are not more than about one inch high, and the air is heated to about 450° F. and is delivered to the paper in the form of jets traveling at about 5,000 feet per minute, the pleated paper can be completely and uniformly cured in less than thirty seconds. This makes it practical to cure an advancing strip of pleated paper at the rate of several thousand pleats per minute.

It is desired to point out that when the slower prior ovens were used to cure the pleated resin-treated paper, the relatively long exposure to heat caused the resin to migrate to the surface of the paper, and also had a tendency to drive off volatiles needed to effect proper curing. The high velocity air jet cure herein contemplated avoids these difficulties and reduces the fire hazards. The velocity of the air carries it in between the pleats into intimate contact with every part of the paper to penetrate and heat the resin treated sheet.

The porous paper to be pleated is preferably impregnated with about 6 to 8 percent of resin based upon the weight of the untreated paper. The resin used is preferably phenol formaldehyde. To cure such resin it is necessary to raise it to a temperature of about 350° F. The hot air jets herein contemplated do this almost immediately in contrast to the slower heating of the paper by the ovens used heretofore.

This high speed and uniform cure can be obtained when the pleats are opened up appreciably during the cure, and also when they are crowded close together. In some cases it is desirable to cure the pleats close together to set them in this condition, and in other cases it is desirable to space them during the cure to set the pleats in spaced relation to each other. In either case the high speed jets of air striking the pleated paper from both sides thereof will cure the paper uniformly at high speed. Furthermore, since the temperature of the air can be controlled accurately, there is practically no fire hazard.

Air jet ovens have been used heretofore to dry traveling paper pulp and rugs but, so far as we know, have not been used as herein contemplated to drive hot air against and between paper pleats to cure the resin in such paper.

The resin impregnated paper to be pleated is preferably supplied from a large roll to the pleating means in the form of a strip of the desired width. This paper is supplied to a rotary pleater of the type that is shown, described and claimed in the Hockett et al. Patent No. 2,771,119. Such rotary pleater is capable of forming pleats about one inch high at a speed of more than 4,000 pleats per minute. As these pleats are formed, they are advanced through the above described air jet oven which will cure the pleats uniformly at this high speed. Furthermore, the speed of the rotary pleating rolls, and that of the conveyor for advancing the pleats through the oven can be synchronized so as to space the pleats apart or crowd them together as desired to impart the desired set to the pleats as they are cured.

The air jet oven of the present invention is capable of producing a row of highly uniform pleats of paper at the rate of more than 240,000 pleats per hour, and of curing this row of pleats uniformly at this rate.

The above and other features of the present invention will be further understood from the following description when read in connection with the accompanying drawings wherein.

Figure 4:
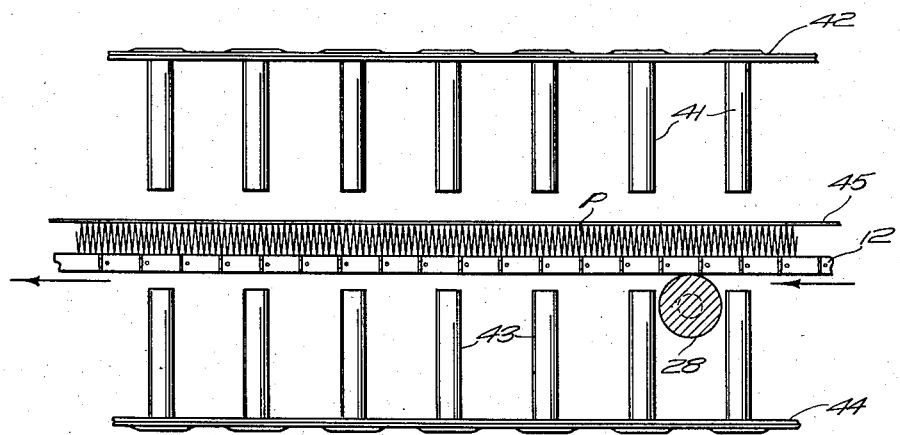

Fig. 4, on a relatively large scale, is a longitudinal, vertical, sectional view within the oven and shows the conveyor apron, pleated paper, and air jet nozzles.

Figure 5:
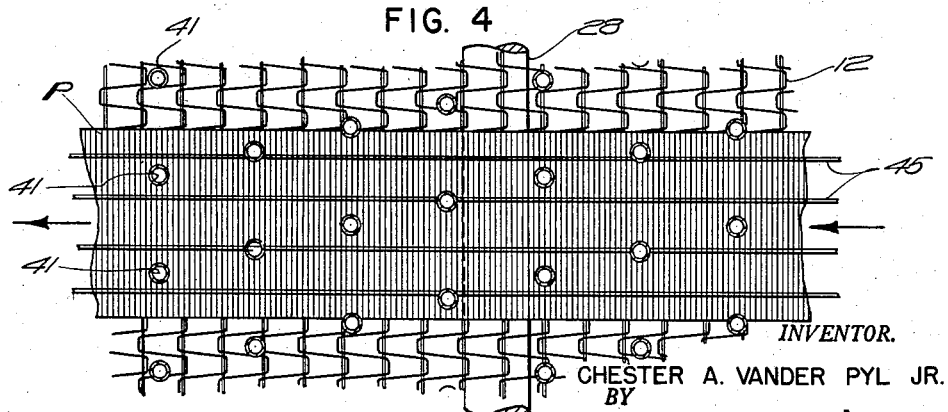

Fig. 5 is a plan view taken within the oven to show the upper jets and looking down upon the pleated paper and conveyor apron.

Fig. 6 is a view similar to Fig. 4 but shows these parts on a still larger scale.

Fig. 7 is a vertical sectional view through the rotary pleater employed to impart pleats to a strip of paper; and Fig. 8 is a perspective view of the finished pleated paper formed on the combined rotary pleater and curing oven.

Figure 1:
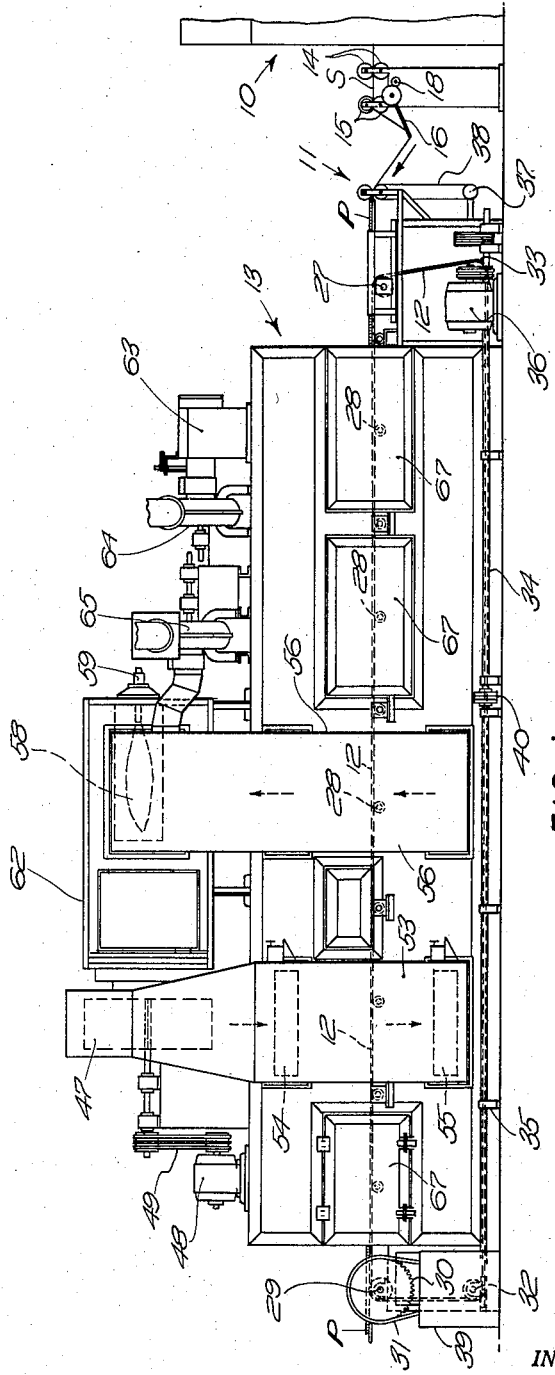
Fig. 1 is a side elevation of one form of combined rotary pleater and curing oven according to the present invention.
Figure 2:
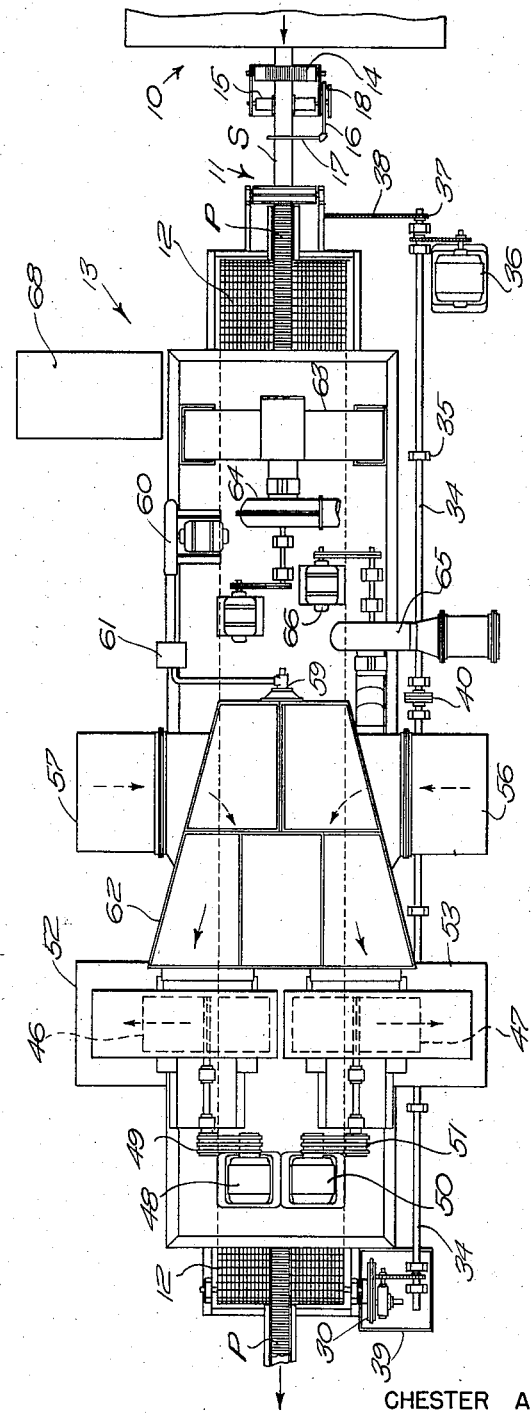
Fig. 2 is a top plan view of the apparatus shown in Fig. 1.

Referring first to Figs. 1 and 2 of the drawings, the strip or ribbon of paper to be pleated is designated by the letter "S" and this preferably is a relatively thick sheet of filter paper which has been treated with a resin such as phenol formaldehyde. This strip of paper may be supplied to the apparatus shown from a large roll of such paper, not shown. Since the paper is impregnated with the resin just mentioned, it is preferable to pre-heat the paper before pleating the same to render the paper more flexible as it reaches the rotary pleater. The pre-heating means for such paper is indicated by the numeral 10 and may be constructed in any suitable manner. The pre-heated paper "S" passes from the pre-heater 10 to the rotary pleater designated in its entirety by 11, and the construction of which pleater is best shown in Fig. 7. The paper "S," after it has been pleated by the apparatus indicated by 11, is designated by the letter "P" and this pleated paper moves along a horizontal guide to a conveyor apron 12, the upper run of which passes through the curing oven designated in its entirety by the numeral 13. The pleated paper 11 resting upon the upper run of this apron 12 is conducted entirely through the oven 13 in the direction indicated by the arrows in Figs. 1 and 2, and issues from the discharge end of such oven with the resin uniformly cured therein. The strip of paper "S" is preferably unwound from a supply roll and is drawn through the pre-heater 10 by a pair of cooperating rolls 14 which may be smooth surface rolls, but are preferably grooved as shown in Fig. 2 so that they will impart slight longitudinal ribs to the sheet of paper and will draw it forward through the oven 10. The cooperating rolls 14 in imparting ribs to the paper are likely to expand the paper transversely and in order that the paper "S" will be of uniform width, it is desirable to trim the edges of such paper adjacent the rolls 14. To this end the cooperating edge trimming rolls 15 are preferably provided. The rolls 14 and 15 are preferably driven by a variable speed electrical motor, and the speed at which these rolls rotate is controlled by a swinging arm 16 having the transverse portion 17 that rests in a loop of the advancing paper strip "S." The arrangement is such that the arm will move upwardly as the loop straightens out and will drop as the loop increases in depth. This movement serves to operate a rheostat indicated by 18, and this rheostat serves to regulate the speed of the driving motor to control the speed at which the strip "S" is supplied to the paper pleating rolls 11.

The high speed rotary pleater indicated by 11 is shown in detail in Fig. 7 and preferably is constructed as shown, described, and claimed in the Hockett et al. patent above cited. Referring to Fig. 7, it will be seen that this rotary pleater has a support base 19, and the spaced uprights 20 extending upwardly therefrom to rotatably support the lower roll 21 and upper roll 22. These rolls are power driven to rotate at the same speed and in the direction indicated by the arrows, and are set close enough together to cause their nip to engage and pull forward the strip of paper "S." Each of these rolls, as shown is provided with four longitudinally extending scoring blades 23, and it will be noted that the scoring blades of the lower roll are angularly disposed with respect to the scoring blades 23 of the upper roll. The arrangement is such that as these rolls rotate and advance the paper strip "S" therebetween, the paper will be scored alternately at its lower face and upper face, and as the paper is discharged from these rolls and crowded into the restricted area provided by the horizontal rails 24 and 25, it will bend back and forth along the scored lines to form the uniform pleats "P" shown in Fig. 7 and various other views. The movement of the pleated paper along the lower rails 24 is preferably retarded by a weighted plate 26.

As the pleated paper is advanced along the lower rails 24 by the rolls 21 and 22, it is fed onto the upper run of the endless apron 12. This apron is a metal apron preferably having the open mesh construction best shown in Fig. 5, and this apron at the right hand end of its upper run, viewing Fig. 1, passes around a number of sprockets mounted upon a rotating shaft 27. The teeth of these sprockets mesh with the open construction of the metal apron 12 and serve to guide the apron and hold the same in proper alignment as it passes through the oven. The oven which may be about 20 feet long, preferably is provided with transversely extending rollers 28 which support the upper run of the apron at sufficient intervals to prevent it from sagging as it travels through the oven. This conveyor apron is driven from the delivery end of the oven by a number of sprockets which mesh with the apron and are rigidly secured to the horizontally extending shaft 29, which is driven at the desired speed by a sprocket wheel 30 and sprocket chain 31. The lower run of the apron 12 preferably travels beneath the oven where it has a chance to cool to some extent before it re-enters the oven. This lower run passes around the lower guide rolls 32 and 33 and may be supported at a number of points along this run by support rolls, not shown.

It is important that the rotary pleater 11 and conveyor apron 12 be driven from the same source of power so that the speed of the apron can be accurately synchronized with the pleating rolls 21 and 22. To this end there is provided the long main driving shaft 34 which is journaled in the brackets 35 disposed close to the floor on which the machine rests. This shaft is driven by a variable speed motor 36 that is adapted to drive the shaft through a wide range of different speeds. The pleating rolls 21 and 22 are driven from the main shaft 34 by a sprocket 37 and chain 38. It is important that means be provided whereby the speed of the pleat advancing apron 12 may be varied with respect to that of the pleater 11. To this end, variable speed mechanism, enclosed in the casing 39 is provided. This variable speed mechanism may be employed to increase or decrease the speed at which the apron 12 travels while the pleater 11 rotates at a constant speed such, for example, at a speed that will produce 4,000 pleats per minute. The rolls 21 and 22 shown in Fig. 7 form four pleats per revolution.

The reason it is important to vary the speed of the apron 12 with respect to the pleater is that it may be desirable to advance the pleats through the curing oven close together when producing one type of filter element, and spaced a substantial distance apart when producing another type of filter element, to thereby impart the desired set to such pleats in the finished filter element. This is taken care of by the variable speed mechanism contained in the housing 39 and which mechanism is driven from the power shaft 34. Since the shaft 34 may be over twenty feet long, it is found desirable to provide a flexible coupling 40 near the central portion of such shaft.

The curing oven 13 employed to cure the resin within the pleated paper is a jet type oven in which a large number of jets are provided above and below the pleated paper passing therethrough. These jets as shown in Figs. 4 and 6 comprise the upper nozzles 41 which extend downwardly from a horizontally extending upper partition 42, and lower nozzles 43 which extend upwardly from the horizontally extending lower partition 44. Each set of nozzles is disposed only several inches apart, both longitudinally and transversely of the oven, and are provided throughout substantially the entire length and width of the oven. These jets are arranged in longitudinal rows that are inclined slightly to the path of the pleated paper through the oven, as shown in Fig. 5 wherein the upper jets 41 are shown in transverse section. The bore of each of the nozzles 41 and 42 is about ½ inch. As will be apparent from Fig. 5, the open mesh metal apron 12 is much wider than the strip of pleated paper "P" resting thereupon. The construction permits more than one row of pleated paper to be deposited upon the apron and advanced thereby through the curing oven to increase the output of such oven. In order to prevent the pleated paper "P" from being raised off the apron 12 by the force of the lower air jets, hold down wires 45 are used. Additional wires, not shown, may be provided to prevent the strip of pleated paper "P" from working laterally on the conveyor apron 12.

Figure 3:
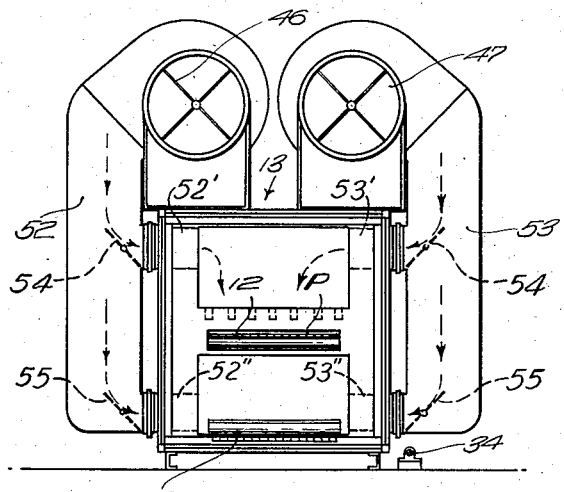
Fig. 3 is an end view looking toward the delivery end of the curing oven of Fig. 1.

Air is supplied to the nozzles 41 and 43 under high pressure and accurately controlled temperature. The oven is preferably formed of sheet metal and the walls are insulated to reduce the loss of heat. The mechanism for heating the air and supplying it to the nozzles is best shown in Figs. 1, 2 and 3 and will now be described. Means are provided for delivering air to the upper set of nozzles 41 and to the lower set of nozzles 43 so that the pressure of such air for each set of nozzles can be accurately controlled. Most of the air after it has been heated and delivered at high speed against the paper is returned for reuse. This air is circulated by two large fans which are best shown in Fig. 3 and are designated by 46 and 47. The fan 46 is driven by the electrical motor 48 and driving belts 49, and the fan 47 is driven by the motor 50 and belts 51. The air upon leaving the fan 46 passes downwardly through a vertical chute 52, and the air upon leaving the fan 47 passes downwardly through a vertical chute 53. The stream of downwardly flowing hot air in the chute 52 is divided by a damper 54, so that part of this stream passes into the upper portion of the oven above the floor plate 42 through a pipe 52', and the rest of this air passes into the oven below the lower floor plate 44 through a pipe 52". Likewise, the air in the chute 53 is divided by a damper 54 to pass inwardly through the pipes 53' and 53".

The amount of air that enters these chambers is regulated by the upper damper 54 and a lower damper 55, which are adjusted by suitable means to control accurately the force of air passing down through the upper nozzles 41 and up through the lower nozzles 43. The air travels through these nozzles at high speed, preferably about 5,000 feet per minute, with the result that the force of these air jets will drive the air between the pleats even when they are crowded close together. This is how the hot air serves to cure the paper quickly and uniformly at the pleat fold or knuckles, and also along the face of the pleats between such knuckles. After the air is discharged from the nozzles 41 and 43 against the paper, most of this air is returned and reused. To this end the upwardly extending chutes 56 and 57 are provided through which the air from between the plates 42 and 44 passes upwardly in the direction indicated by the arrows in Fig. 1, to be reheated by the gas flame 58 from a burner 59. This burner 59 is supplied with illuminating gas from a city supply line and with air supplied by the blower fan 60. The mixture of air and gas is automatically controlled at 61 and delivered to the burner 59 to form the flame 58 within the cone shaped receptacle 62, where it heats air supplied to this receptacle by the upwardly extending passages 56 and 57. The temperature at which the air is heated by the flame 58 is automatically controlled to heat the air to approximately 450° F. and it is not difficult to maintain the temperature of the air within several degrees of the selected operating temperature.

It is important to provide exhaust means for removing some air from the curing oven and thereby dispose of obnoxious gases, and supply some fresh air to the oven. To accomplish this, the exhaust passages 63 are preferably provided above the oven and are connected to an exhaust fan 64 which is motor driven and serves to expel air through an exhaust pipe extending out of the building in which the machine is installed. Some air enters adjacent the apron at each end of the oven to replace air removed by the exhaust fan.

It is important to provide means to prevent the pleated paper within the oven from being overheated if it becomes necessary to stop the travel of the conveyor belt 12. Means are therefore provided whereby, if the travel of the belt 12 is slowed down beyond a predetermined speed, the motors 48 and 50 for driving the fans 46 and 47 will be stopped, the flame 48 will be turned down and a purge fan 65, driven by a motor 66, will be started to remove the hot air from the oven and discharge it through a pipe leading out of the building.

As will be seen from Fig. 1 of the drawings, removable side doors 67 are provided so that access can be had to the interior of the oven. Much of the mechanism above described is electrically controlled by instruments housed in the cabinet 68 shown in Fig. 2 of the drawing.

One important advantage secured by the air jet oven above described to cure the pleats "P" results from the fact that the velocity and direction of the air at each side of the advancing pleated paper will force the pleats apart enough to allow air to enter between the pleats and pass through the porous paper. This serves to cure the paper uniformly at the knuckles and along the faces of the pleats. Furthermore, while the air is hot enough to cure the resin in an instant, it will not set the paper on fire as long as the oven is kept reasonably clean of paper, lint, and particles of resin, and the paper continues to move quickly through the oven. The arrows shown in Fig. 6 indicate how the air from the jets strikes the pleated knuckles and enters between the pleats. Since the hot air, due to its velocity, penetrates the porous paper, the resin is cured in the paper and is not drawn to its surface to form a surface film that would seriously reduce the porosity of the paper.

The resin treated pleated porous paper "P" upon leaving the curing oven 12 is adapted for use to form the filter element of oil filters or air filters, as above mentioned, but before the paper can be so used it needs to be cut into successive lengths each having the desired number of pleats required for a predetermined filter cartridge. The pleated paper "P" issues rapidly from the oven in a continuous length, and it is important to provide means that will count the pleats at the speed at which they issue from the oven 12, and cut this sheet each time the proper number of pleats are counted. A highly satisfactory machine for counting the pleats and cutting the sheet at the speed it issues from the oven 12 is shown, described and claimed in the Paton et al. Patent No. 2,833,351.

The apron 12 may travel at a speed of over 100 feet per minute, and the paper need remain in the oven only from about 15 to 30 seconds to secure the desired cure needed to stiffen the paper and prevent it from becoming soft in the presence of moisture. The height of the pleats may be anywhere from less than one half inch to an inch or more, and a uniform cure can be secured with even the highest pleats.

Having thus described my invention, what I claim and desire to protect by Letters Patent is:

The method of curing porous, resin-treated pleated paper at high speed and while the pleats lie close together; which consists of rapidly advancing the pleated sheet with the pleats close together between an upper and lower bank of hot air jets, delivering the hot air forming such jets against the pleated paper at a temperature high enough to cure the paper quickly and normal to the travel of the paper and at a velocity of several thousand feet per minute to momentarily spring the pleats apart adjacent each jet so that the hot air will enter between the pleats and cure the faces of the pleats without overcuring the knuckles of the pleats, to thereby cure the pleated sheet at the rate of several thousand pleats per minute.

References Cited in the file of this patent

UNITED STATES PATENTS

| | | |
|---|---|---|
| 1,504,218 | Crowell | Aug. 12, 1924 |
| 2,265,071 | Hartenbach | Dec. 2, 1941 |
| 2,513,777 | Andre | July 4, 1950 |
| 2,532,032 | Offen | Nov. 28, 1950 |
| 2,590,849 | Dungler | Apr. 1, 1952 |
| 2,590,850 | Dungler | Apr. 1, 1952 |
| 2,597,490 | Hurxthal | May 20, 1952 |
| 2,761,490 | Walton | Sept. 4, 1956 |
| 2,771,119 | Hockett et al. | Nov. 20, 1956 |